US006862294B1

(12) United States Patent
Hann et al.

(10) Patent No.: US 6,862,294 B1
(45) Date of Patent: Mar. 1, 2005

(54) METHOD AND APPARATUS FOR OVERCOMING LARGE TRANSPORT DELAYS BETWEEN MASTER AND SLAVE UTOPIA DEVICES

(75) Inventors: William P. Hann, Round Rock, TX (US); Richard L. House, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 784 days.

(21) Appl. No.: 09/751,061

(22) Filed: Dec. 27, 2000

(51) Int. Cl.[7] .............................................. H04L 124/03
(52) U.S. Cl. .................... 370/449; 370/395.6; 370/419; 370/463
(58) Field of Search ................................ 370/412–413, 370/419–421, 449–463, 395.6, 465–476, 535–545, 474, 450, 451, 392

(56) References Cited

U.S. PATENT DOCUMENTS

| | | | | |
|---|---|---|---|---|
| 6,307,858 B1 | * | 10/2001 | Mizukoshi et al. | .... 370/395.71 |
| 6,356,557 B1 | * | 3/2002 | Nichols et al. | ............. 370/449 |
| 6,487,203 B1 | * | 11/2002 | Chung et al. | ............ 370/395.1 |
| 6,574,228 B1 | * | 6/2003 | Ganor et al. | ............. 370/395.7 |
| 6,671,758 B1 | * | 12/2003 | Cam et al. | .................. 710/100 |
| 6,751,233 B1 | * | 6/2004 | Hann | ......................... 370/466 |
| 2004/0052258 A1 | * | 3/2004 | Robertson | ................... 370/392 |
| 2004/0151200 A1 | * | 8/2004 | Robertson | ................... 370/449 |

* cited by examiner

*Primary Examiner*—Dang Ton
*Assistant Examiner*—Tri H. Phan
(74) *Attorney, Agent, or Firm*—Baker Botts L.L.P.

(57) ABSTRACT

A system for communicating information includes a master UTOPIA device having a receive transfer controller operable to control reception of data by the master UTOPIA device and a transmit transfer controller operable to control transmission of data from the ATM switch. The system also includes a slave UTOPIA device having at least one memory area. The slave UTOPIA device includes a receive poll controller operable to determine whether the memory area is available to transmit data for receipt by the master UTOPIA device and further operable to communicate the result of the determination to the receive transfer controller. The slave UTOPIA device also includes a transmit poll controller operable to determine whether the memory area is available for receiving data to be transmitted by the master UTOPIA device and further operable to communicate the result of the determination to the transmit transfer controller.

34 Claims, 5 Drawing Sheets

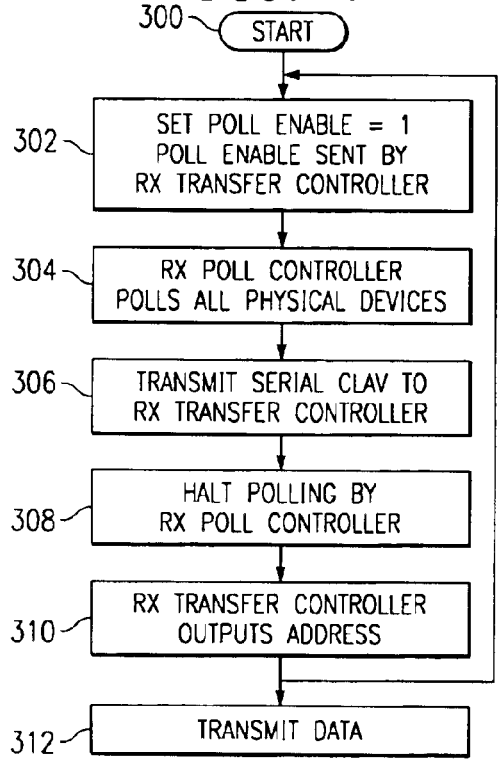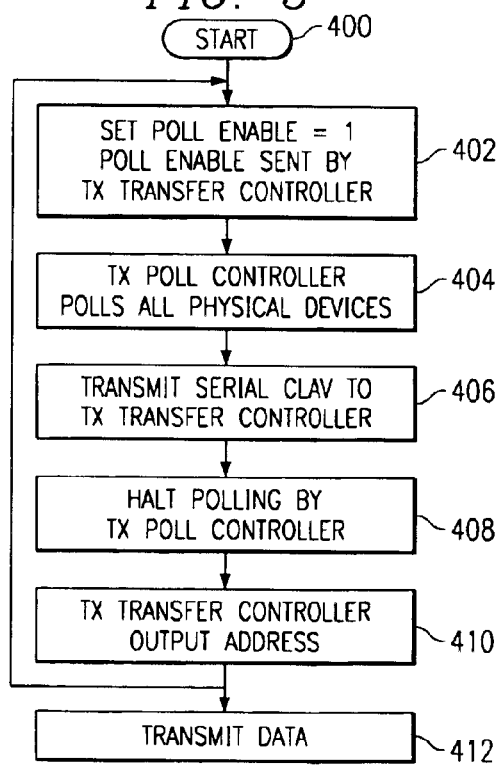

METHOD AND APPARATUS FOR OVERCOMING LARGE TRANSPORT DELAYS BETWEEN MASTER AND SLAVE UTOPIA DEVICES

TECHNICAL FIELD OF THE INVENTION

This invention relates generally to computer and telecommunications networks and more particularly to a method and apparatus for overcoming large transport delays between master and slave UTOPIA devices.

BACKGROUND OF THE INVENTION

Manufacturers of network equipment encounter increasingly complex data transfer design issues as networks and network devices have evolved into sophisticated systems. An increasing number of network systems now utilize asynchronous transfer mode (ATM) technology, which in many applications provides a more effective way to transfer data across a network.

ATM is a layered architecture allowing multiple services like voice, data, and video to be mixed over the network. Three lower level layers have been defined to implement the features of ATM. An Adaptation Layer assures the appropriate service characteristics and divides all types of data into a 48 byte payload that will make up an ATM cell. An ATM Layer takes the data to be sent and adds a 5 byte header information that assures the cell is sent to the right connection. A Physical Layer defines the electrical characteristics in network interfaces. This layer performs necessary operations to effect transmission of data along the transmission media. However, ATM is not tied to a specific type of physical transport.

A number of protocols exist for transmission of information between the ATM Layer and the Physical layer. One such protocol is the Universal Tests and Operation Physical Interface for ATM (UTOPIA) data path interface. UTOPIA defines the interface between the Physical Layer and upper layer modules such as the ATM Layer. The definition allows a common physical interface in ATM sub-systems across a wide range of speeds and media types. UTOPIA controllers are physical devices that implement the UTOPIA protocol for transmitting information between the physical layer and the ATM layer. A UTOPIA I controller is capable of controlling a single slave device, a UTOPIA II controller is capable of controlling a plurality of slave devices, and a UTOPIA III controller is capable of controlling an even larger number of slave devices.

UTOPIA protocol is often used to transfer data between an ATM card and a line card. Often the DSL line card will be physically located at a significant distance from the ATM card. Communicating data from the ATM card to the DSL line card directly over a cable according to UTOPIA specifications is not currently implemented because of the large transport delays that would be associated with transmitting timing signals and data over a large-length cable. Therefore, current implementations utilize two UTOPIA devices located between the ATM card and the line card to effect such transfer.

These devices consists of a physical device located on the ATM card acting as a UTOPIA slave and a master UTOPIA controller. Data is transferred between the ATM card and the slave physical device according to UTOPIA protocol, and data is transferred from the master UTOPIA controller to the DSL line card according to UTOPIA protocol. However, data is transferred between the slave UTOPIA physical device and the master UTOPIA controller according to any suitable format, and typically in serial format.

Such an implementation for data communication between an ATM card and a physical device, such as a DSL line card, is expensive and consumes more resources than needed.

SUMMARY OF THE INVENTION

Accordingly, a need has arisen for a method and apparatus for overcoming large transport delays between master and slave UTOPIA devices. The present invention provides a method apparatus that addresses shortcomings of prior systems and methods.

According to one embodiment of the invention, a system for communicating information includes a master UTOPIA device having a receive transfer controller operable to control reception of data by the master UTOPIA device and a transmit transfer controller operable to control transmission of data from the ATM switch. The system also includes a slave UTOPIA device having at least one memory area. The slave UTOPIA device includes a receive poll controller operable to determine whether the memory area is available to transmit data for receipt by the master UTOPIA device and further operable to communicate the result of the determination to the receive transfer controller. The slave UTOPIA device also includes a transmit poll controller operable to determine whether the memory area is available for receiving data to be transmitted by the master UTOPIA device and further operable to communicate the result of the determination to the transmit transfer controller.

According to another embodiment of the invention, a method for communicating information between master and slave UTOPIA devices includes providing a master UTOPIA device having a receive transfer controller operable to control reception of data by the master UTOPIA device and a transmit transfer controller operable to control transmission of or from the master UTOPIA device. The method also includes providing a slave UTOPIA device having a receive poll controller operable to determine whether the slave utopia device is available to transmit data and further operable to communicate the result of the determination to the receive transfer controller and a transmit poll controller operable to determine whether the slave UTOPIA device is available for receiving data and further operable to communicate the result of determination through the transmit transfer controller. The method further includes connecting the master UTOPIA device to the slave UTOPIA device and transmitting information between the master UTOPIA device and the slave UTOPIA device. The step of transmitting includes determining, by the receive poll controller located on the slave UTOPIA device that the slave UTOPIA device is ready to transfer data to the master UTOPIA device, and in response initiating, by the receive transfer controller located on the master UTOPIA device, transfer of data from the slave UTOPIA device to the master UTOPIA device and determining, by the transfer poll controller located on the slave UTOPIA device, that the slave UTOPIA device is ready to receive data to be transmitted by the master UTOPIA device, and in response initiating, by the transmit transfer controller located on the master UTOPIA device, transfer of data from the master UTOPIA device to the slave UTOPIA device.

Some embodiments of the invention provide numerous technical advantages. For example, some embodiments of the invention allow communication of the data between a master UTOPIA device, such as an ATM card, and a slave UTOPIA device, such as a DSL card, over a medium having significant length without the adverse effects typically associated with direct communications between the two devices. Furthermore, such data communication may be effected without the use of intervening UTOPIA physical slave device and a master UTOPIA controller, thereby decreasing the costs of implementing certain communications systems, such as DSL. According to another embodiment, the amount of memory used on the line card is reduced because no intermediate storage is required on the line card.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 4 is a flowchart illustrating a method for receiving data at the master UTOPIA device illustrated in FIGS. 2 and 3 from the slave UTOPIA device shown in FIGS. 2 and 3;

FIG. 5 is a flowchart showing method for transmitting data from the master UTOPIA device shown in FIGS. 2 and 3 to the slave UTOPIA device shown in FIGS. 2 and 3.

DETAILED DESCRIPTION OF THE INVENTION

Embodiments of the present invention and its advantages are best understood by referring to FIGS. 1 through 6 of the drawings, like numerals being used for like and corresponding parts of the various drawings.

Figure 1:
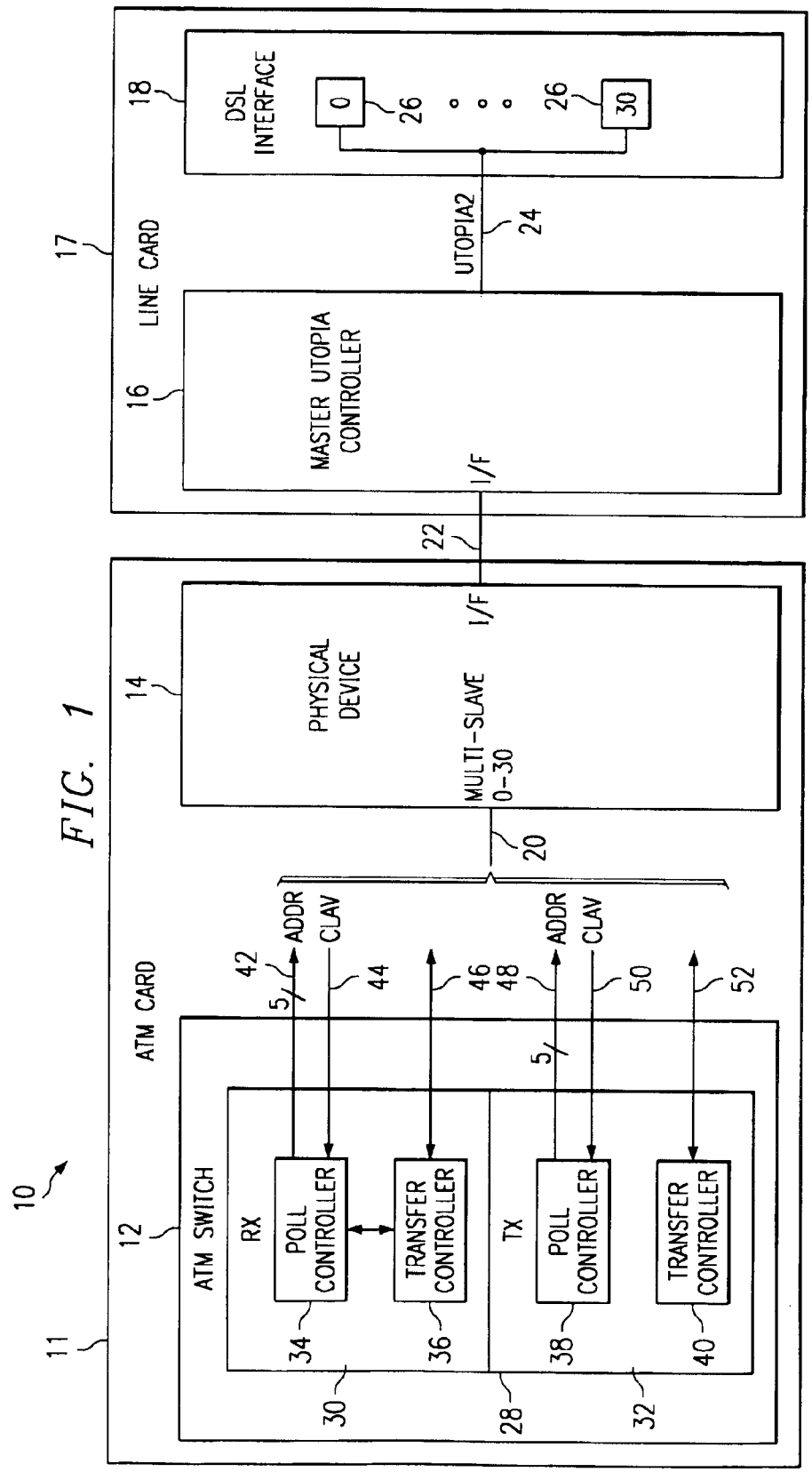
FIG. 1 is a block diagram of a communications system showing conventional components utilized to transfer data between a master UTOPIA device and a slave UTOPIA device.

FIG. 1 is a block diagram of a communications system 10. Communications system 10 allows communication of data between the ATM layer and the physical layer in asynchronous transfer mode communications. As illustrated, communications system 10 includes an ATM card 11 and a line card 17. ATM card includes an ATM switch 12 and a physical device 14, each described in greater detail below. Line card 17 includes a DSL interface 18 and a master UTOPIA controller 16, each described in greater detail below. ATM switch 12 implements the functions of the ATM layer specified by ATM specifications. These functions include adding a five-byte header that assures a cell is sent to the correct connection. Relevant ATM specifications include Utopia 3. Physical Layer Specification af-phy0136.000, November 1999; Utopia Level 2 af-phy-0039.000, June 1995; and Utopia af-phy-0017.000, March 1994, and may be found at, for example, ATMFORUM, which is incorporated herein by reference. In this example, ATM switch 12 acts as a master UTOPIA device because, as described below, it controls data transfer with it according to UTOPIA specifications. DSL interface 18 implements the physical layer functions specified by the above-referenced ATM specification. DSL interface 18 performs necessary operations to effect transmission of data along a subsequent transmission media (not explicitly shown). DSL interface 18 may be designed to implement various types of physical layers, including DSL, Gigabit Ethernet, and SONET. In this example, DSL interface 18 acts as a slave UTOPIA device because, as described below, data transfer with it is controlled by a master UTOPIA device. Communication with ATM switch 12 and with DSL interface 18 occurs according to the Universal Tests and Operation Physical Interface for ATM (UTOPIA). UTOPIA defines the interface between ATM switch 12 and physical device 14 between master UTOPIA controller 16 and DSL interface 18. UTOPIA includes various forms, which currently include UTOPIA I, UTOPIA II and UTOPIA III, described above.

In order to transfer data between ATM switch 12 and DSL interface 18 according to UTOPIA specifications, conventional implementations utilize a physical slave device 14 and a master UTOPIA controller 16 disposed between ATM switch 12 and DSL interface 18. These devices 14 and 16 act as an intermediary for data transfer between ATM switch 12 and DSL interface 18. Physical device 14 operates as a slave UTOPIA device and communicates with ATM switch 12 under the control of ATM switch 12, as described below. Master UTOPIA controller 16 acts as a master UTOPIA controller and communicates with DSL interface 18 according to UTOPIA specifications over line 24 under the control of master UTOPIA controller 16. Therefore, ATM switch 12 and physical device 14 communicate with each other according to UTOPIA specifications, and master UTOPIA controller 16 and DSL interface 18 communicate with each other according to UTOPIA specifications. Once data is transferred to either physical slave device 14 or master UTOPIA controller 16, data may then be transferred between device 14 and 16 over cable 22 according to any suitable format, and not necessarily UTOPIA. Cable 22 may be a suitable media for transmitting data between ATM switch 12 and line card 18. One example of cable 22 is a backplane.

Transfer delays conventionally have hindered utilization of UTOPIA protocol for transferring data over a large distance because of the timing requirements associated with UTOPIA protocol are inconsistent with large transport delays, which are normally associated with transfer of data over a large distance. Because of this problem, physical device 14 and master UTOPIA controller 16 have conventionally been used to effect transfer between a 4 master UTOPIA device 12, such as an ATM switch and a DSL interface 18, such as a DSL card, when the two devices are located a large distance from each other. The invention recognizes alternative methods for directly transferring data between ATM switch 12 and DSL interface 18 that do not require the superfluous use of physical device 14 and master UTOPIA controller 16. Such methods may be best described by first providing a description of certain components within ATM switch 12 relevant to its operation as a UTOPIA controller.

Conventionally, ATM switch 12 includes a UTOPIA controller 28 and is capable of controlling a slave device, such as physical slave device 14. If UTOPIA II protocol is utilized, a UTOPIA II controller located on ATM switch 12 may control a plurality of devices 14. If UTOPIA III protocol is utilized, a UTOPIA III controller on ATM switch 12 controls a plurality of devices 14, and also allows transmission of data in 32 bits (as opposed to 16 for UTOPIA I and UTOPIA II).

UTOPIA controller 28 includes a receive UTOPIA controller 30 and a transmit UTOPIA controller 32. Receive UTOPIA controller 30 includes a poll controller 34 and a transfer controller 36. Transmit UTOPIA controller 32 includes a poll controller 38 and a transfer controller 40. The receive poll controller 34 transmits an address 42 corresponding to a physical device from which data is to be received. In response, the physical device, such as, in this example, physical device 14, returns a cell available indication 44, to receive poll controller 34. In an analogous manner, transmit poll controller 38 transmits an address 48 corresponding to a particular physical device, such as device 14 and in response receives a cell available indication, as indicated by 50. In this manner, data is transferred from a master UTOPIA device, such as ATM switch 12, to a slave UTOPIA device, such as physical device 14.

According to the teachings of the invention, poll controllers are located remotely from the UTOPIA controller on a UTOPIA slave device to allow communication between the UTOPIA master and the UTOPIA slave device, without the use of devices 14 and 16 while overcoming large transport delays that would otherwise occur. Except where otherwise indicated, hereinafter in this document, master UTOPIA device refers to a device that includes a transfer controller for controlling transfer of data with the master UTOPIA device and a slave UTOPIA device refers to a device that is controlled in such a manner by the master UTOPIA device and that also includes poll controllers. This is in contrast to conventional usage that refers to master UTOPIA devices that include both transfer controllers and poll controllers and slave UTOPIA devices that do not include poll controllers. Embodiments of the invention are described in greater detail in conjunction with FIGS. 2 through 6.

Figure 2:
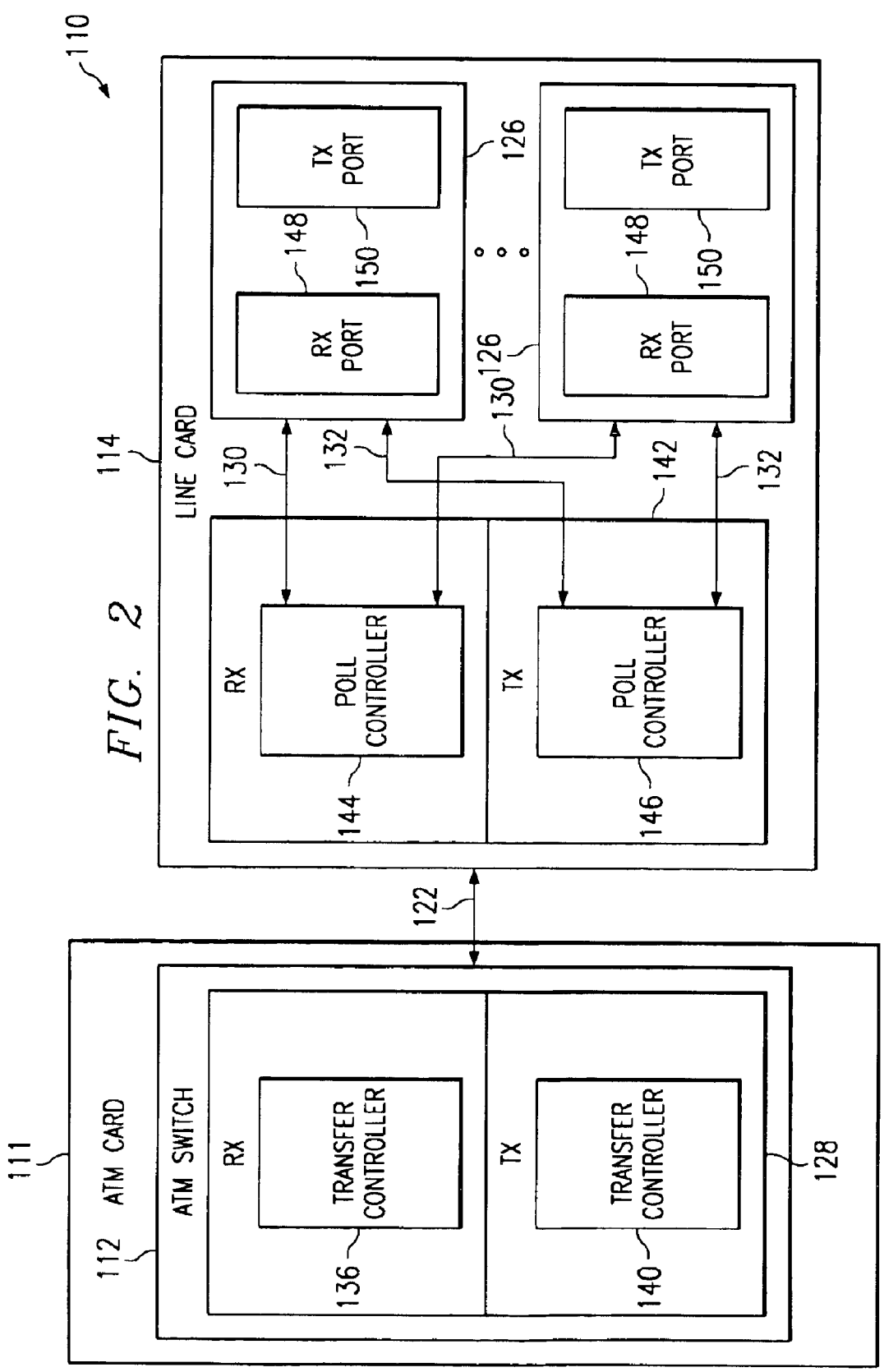
FIG. 2 is a block diagram of a communications system for transferring data from a master UTOPIA device to a slave UTOPIA device according to the teachings of the present invention.

FIG. 2 is a block diagram illustrating a UTOPIA communications system 110. UTOPIA communications system 110 includes an ATM card 111 having an ATM switch and also includes a line card 114. ATM card 111 may include other components not relevant to the present invention. ATM switch 112 is one example of a master UTOPIA device, and line card 114 is one example of a slave UTOPIA device. Other master and slave UTOPIA devices may be utilized without departing from the scope of the present invention. ATM switch 112 and line card 114 are similar to ATM switch 12 and line card 14, except as described below. ATM switch 112 communicates with line card 114 using UTOPIA protocol over cable 122. ATM switch 112 and line card 114 may communicate directly over cable 122, without intervening devices, such as physical slave device 14 even if cable 122 has a significant length that heretofore would have prevented direct communication between ATM switch 112 and line card 114 according to UTOPIA specifications.

According to the teachings of the invention, poll controllers 144 and 146 are located on line card 114, as opposed to locating these poll controllers on ATM switch 112. This allows ATM switch 112 and line card 114 to be located a considerable distance from each other, yet communicate directly. Otherwise, locating ATM switch 112 a considerable distance from line card 114 would result in unacceptable timing delays associated with ATM switch 112 polling devices on line card 114.

ATM switch 112 includes a transfer controller system 128 for controlling reception of data from line card 114 and transmission of data to line card 114. Transfer controller system 128 includes a receive transfer controller 136 and a transmit transfer controller 140. Receive transfer controller 136 controls reception of data by ATM switch 112. Transmit transfer controller controls transmission of data from ATM switch 112 to line card 114.

Line card 114 includes a poll control system 142 and a plurality of DSL modems 126. Poll control system 142 controls polling of devices on line card 114, such as a DSL modem 126. Poll control system 142 includes a receive poll controller 144 and a transmit poll controller 146. Receive poll controller 144 controls polling of DSL modems 126 to determine whether DSL modem 126 is prepared to transfer data from line card 114 over cable 122 for receipt by ATM switch 112. Transmit poll controller 146 polls DSL modem 126 to determine whether DSL modem 126 is ready to receive data transferred by ATM switch 112. Poll controllers 144 and 146 are, in one embodiment, devoid of any memory areas, resulting in lower cost implementation.

DSL modems 126 perform manipulations on data received from ATM switch 12 necessary to transmit data along a digital subscriber line (DSL) and, conversely, perform manipulations on data it receives for transfer to ATM switch 112. DSL modems 126 include a receive UTOPIA port assembly 148 and a transmit UTOPIA port assembly 150. Receive poll controller 144 communicates with receive UTOPIA port assembly 148 on DSL modems 126 over bus 130. Transmit poll controller 146 communicates with transmit UTOPIA port assembly 150 on DSL modems 126 over bus 132. Additional details of UTOPIA communications system 110 and its operation are described in conjunction with FIG. 3.

Figure 3:
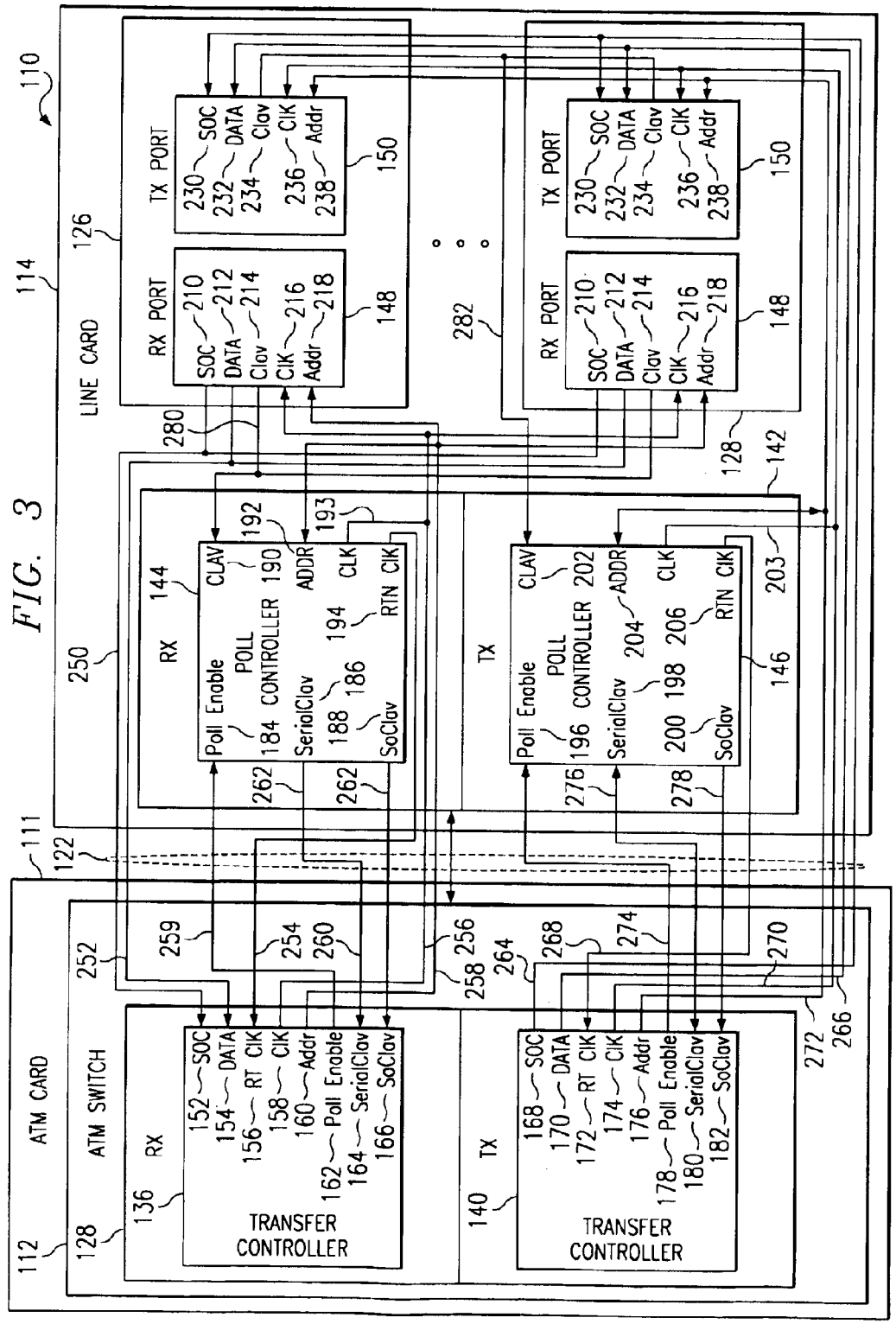
FIG. 3 is a block diagram of the communications system of FIG. 2 showing additional details of the system, including ports for receiving data and instruction signals as well as the associated signals.

FIG. 3 is a block diagram of communication system 110 showing additional details of the system. As illustrated, receive transfer controller 136 includes a plurality of ports associated with communication according to UTOPIA protocol. Those ports are identified below according to conventional UTOPIA name and by reference numeral. The ports include a start of cell port 152 (SOC), a data port 154, a return clock port 156 (RTCLK), a clock signal port 158 (CLK); an address port 60 (ADDR), a poll enable port 162 (POLL ENABLE), a serial cell available port 164 (SERIAL CLAV), and a start of serial cell available port 166 (SOCLAV). These ports receive and transmit information as described below.

Start of cell port 152 receives an indication that data is about to be transmitted. Data port 154 receives data transferred from line card 114. Return clock port 156 receives a clock signal returned from poll controller 144 that aligns incoming data. Clock port 158 provides a clock signal to DSL modem 126 to control timing of transfer of data from DSL modem 126 to ATM switch 112. Address port 160 provides the address of a particular DSL modem 126 that will provide data for receipt by ATM switch 112. Poll enable port 162 provides an indication that polling of DSL modems 126 should begin or stop. Serial cell available port 164 receives serial cell available information for each DSL modem 126. Start of serial cell available port 166 receives an indication from receive poll controller 144 that serial cell available information transmitted to port 164 is about to be initiated.

Transmit transfer controller 140 includes the same type of ports as receive transfer controller 136, as identified here: a start of cell port 168, a data port 170, a return clock port 172, a clock signal port 174, an address port 176, a poll enable port 178, a serial cell available port 180, and a start of cell available port 182. The ports on transmit transfer controller 140 function in a similar manner as those on receive transfer controller 136 with the following differences: start of cell port 168 and data port 170 provide, rather than receive, respective signals, as compared to receive transfer controller 136.

Receive poll controller 144 on line card 114 also includes a number of ports for receiving and transmitting information. Those ports are identified here as: a poll enable port 184 (POLL ENABLE), a serial cell available port 186 (SERIAL CLAV), a start of serial cell available port 188 (SOCLAV), a cell available port 190 (CLAV), an address port 192 (ADDR), a clock port 193 (CLK), and a return clock port 194 (RTNCLK).

Transmit poll controller 146 includes the same types of ports and are identified as follows: a poll enable port 196, a serial cell available port 198, a start of serial cell available port 200, a cell available port 202, a clockport 203, an address port 204, and a return clock port 206.

Poll enable port 184 on receive poll controller 144 receives an indication from receive transfer controller 136 that polling should begin. Serial cell available port 186 provides serial cell available information for each of DSL modems 126 to receive transfer controller 136. Start of cell available port 188 provides to receive transfer controller 136 an indication that serial cell available port 186 is about to transfer serial cell available information for DSL modems 126. Cell available port 190 receives an indication from DSL modem 126 that it is available to receive data. Address port 192 provides an address location identifying a particular one of the devices 148 from which data will be received by ATM switch 12. Address port 192 also receives an address from address port 160, which may be used to verify that a particular one of devices 148 is ready to transfer data. Clock port 193 receives a clock signal from transfer controller 136. Return clock port 194 provides a return clock signal to receive transfer controller 136 to control timing of reception of data by ATM switch 112 from line card 114.

The ports on transmit port controller 146, described above, provide or receive analogous information as the respective ports describe above in conjunction with receive poll controller 144.

As illustrated, each of DSL modems 126 includes a receive port assembly 148 and a transmit port assembly 150. Receive port assembly 148 operates to provide data for receipt by ATM switch 112 under the control of receive transfer controller 136 on ATM switch 112. Transmit port assembly 150 operates to receive data transmitted by ATM switch 112 under the control of transmit transfer controller 140. The ports associated with each port assembly are described below.

Receive port assembly 148 includes a start of cell port 210 (SOC), a data port 212 (DATA), a cell available port 214 (CLAV), a clock port 216 (CLK), and an address port 218 (ADDR). Start of cell port 210 provides an indication that data is about to be transmitted to receive transfer controller 136 on ATM switch 112. Data port 212 provides data for transfer from receive port assembly 148 to ATM switch 12 through receive transfer controller 136. Cell available port 214 provides an indication to receive poll controller 144 that device 126 is prepared to transmit data for receipt by ATM switch 112. Clock port 216 receives a clock signal to control timing of polls and resulting signaling and data transfer. Address port 218 receives the address of the particular DSL modem 126 that will provide the data for receipt by ATM switch 112.

Transmit port assembly 150 includes similar ports with the following differences: A start of cell port 230 and a data port 232 each receive their respective signals rather than provide their respective signals, as is the case with analogous ports on receive port assembly 148.

As described above, communications system 110 operates to allow communication of data between ATM switch 112 and UTOPIA devices such as modems. Accordingly, two modes of operation exist. In a receive mode, ATM switch 112 receives data from DSL modems 126. In a transmit mode, ATM switch 112 transmits data from ATM switch 112 to DSL modems 126. Each of these modes is described separately below in conjunction with FIGS. 4 and 5.

FIG. 4 is a flowchart illustrating a method for receiving data at ATM switch 112 that is transferred by line card 114. The method begins at step 300. At a step 302 receive transfer controller 136 expresses a desire to have DSL modems 126 polled to determine whether a particular device is ready to transmit data for receipt by ATM switch 112. To do so, receive transfer controller 136 outputs from poll enable port 162 a signal 259 for receipt by poll enable port 184 on receive poll controller 144. Signal 259 is set to "1," indicating polling should begin. At a step 304, receive poll controller 144 polls all DSL modems 126 and accumulates cell available signals 280 provided by cell available ports 214 of receive port assembly 148. In response, at step 306 receive poll controller 144 outputs from serial cell available port 186 a signal 260 that includes a serialized version of the cell available status for each DSL modem 126. Signal 260 therefore provides to receive transfer controller 136 at serial cell available port 164 an indication of which devices are available to transmit data for receipt by ATM switch 12.

As part of step 306 of transmitting the serial cell available information from receive poll controller 144 to receive transfer controller 136, a start of serial cell available signal 262 is provided from start of cell available port 188 to start of cell available port 166 along signal 262. Signal 262 therefore provides an indication that a serial cell available signal 260 is about to be transmitted.

At step 308, when receive transfer controller 136 receives on serial cell available port 164 signal 260 indicating that a DSL modem 126 is available to transmit data for reception by ATM switch 112, receive transfer controller 136 transmits from poll enable port 162 a poll enable signal 259 having a value of "0." Such a signal received by receive poll controller 144 at poll enable port 184 halts polling of DSL modems 126. This allows subsequent transfer of cells.

At step 310 receive transfer controller 136 initiates data transfer for reception by ATM switch 112 by outputting the address of a selected available DSL modem 126 that is ready to transfer data. This step is performed by outputting signal 258 for receipt by address port 218 on receive port assembly 148. Clock signal 256, which is provided by clock port 158, controls timing of transfer of data between line card 114 and ATM switch 112.

In response to step 310, receive port assembly 148 associated with the specified address signal 258 transmits data according to UTOPIA specifications at step 312. In this regard, start of cell port 210 on receive port assembly 148 outputs signal 250 for receipt by start of cell port 152 on receive transfer controller 128. Signal 250 indicates the beginning of a data transfer. A data port 212 on receive port assembly 148 also transmit data as data signal 252 for receipt by data port 154 on receive transfer controller 136, thereby effecting data transfer from line card 114 to ATM switch 112. Return clock port 194 outputs a return clock signal 254 for receipt by return clock port 156 for aligning receipt of data signal 252 and clock signal 256. Return clock signal 254 is generated based on clock 256 and is returned to return clock port 156 to control timing of data receipt. Delay associated by generating return clock signal 254 at return clock port 194 on line card 114 data signal 252, which originated from line card 114, may be appropriately aligned by return clock signal 254. Once transmission begins, the method continues with step 302 in which a signal 259 is reset to 1 to enable continued polling of all devices 126. This polling may occur while data are transferred.

In the above-described manner, data is transferred from a UTOPIA device, such as line card 114 and received by ATM switch 112. According to the teachings of the invention, such transfer may occur over a significant length cable 122 while overcoming significant transport delay.

FIG. 5 is a flowchart illustrating a method of ATM switch 112 transferring data to DSL modems 126. Many of the steps associated with transferring data to DSL modems are analogous to the corresponding steps associated with receiving data at ATM switch 112. The method begins at step 400. At a step 402, transmit transfer controller 140 on ATM switch 112 output on poll enable port 178 signal 274 equal to "1." Signal 274 is received by poll enable port 196 on transmit poll controller 146. Setting signal 274 equal to "1" instructs transmit poll controller 146 to poll all devices 126. At a step 404, transmit poll controller 146 polls all physical devices. In doing so, transmit poll controller 146 receives cell available signals 282 from cell available ports 234. Signal 282 indicates, for each device 126, whether the device is available to receive data transmitted by ATM switch 112.

Transmit poll controller 146 receives the cell available information and converts it into a serial cell available signal, which is transmitted at serial cell available port 198 for receipt at serial cell available port 180 on transmit transfer controller 140. Transmit poll controller 146 additionally provides at start of cell available port 200 an indication that the serial cell available signal 276 is about to begin. Signal 278 is received by transfer controller 140 at start of cell available port 182. If signal 276 indicates that the device to which data is to be transferred is available, polling is halted by transmit transfer controller 140 transmitting from poll enable port 178 a signal 274 equal to "0." Such a value for signal 274, which is received by poll enable port 196 on transfer poll controller 146, halts polling by transmit poll controller 146. If signal 276 indicates the device 126 to which data is to be transferred is not available, polling continues (not explicitly shown).

After polling by transmit poll controller is halted, transmit transfer controller outputs an address of device 126 to which data is to be sent on address port 176. Also transmitted by transmit transfer controller 140 is a clock signal 270 provided at clock port 174 and the data to be transferred provided at data port 170. The data signal 266, clock signal 270, and address signal 272 are received by respective ports on transmit port assembly 150 on the device 126 associated with the address indicated by signal 272.

After data transfer is initiated, transmit transfer controller 140 transmits from poll enable port 178 signal 274 equal to "1" to continue polling at step 402.

In the above-described manner, data is transferred from ATM switch 112 and received by a UTOPIA device, such as line card 114. According to the teachings of the invention, such transfer may occur over a significant link cable 122 while overcoming significant transport delay.

Figure 6:
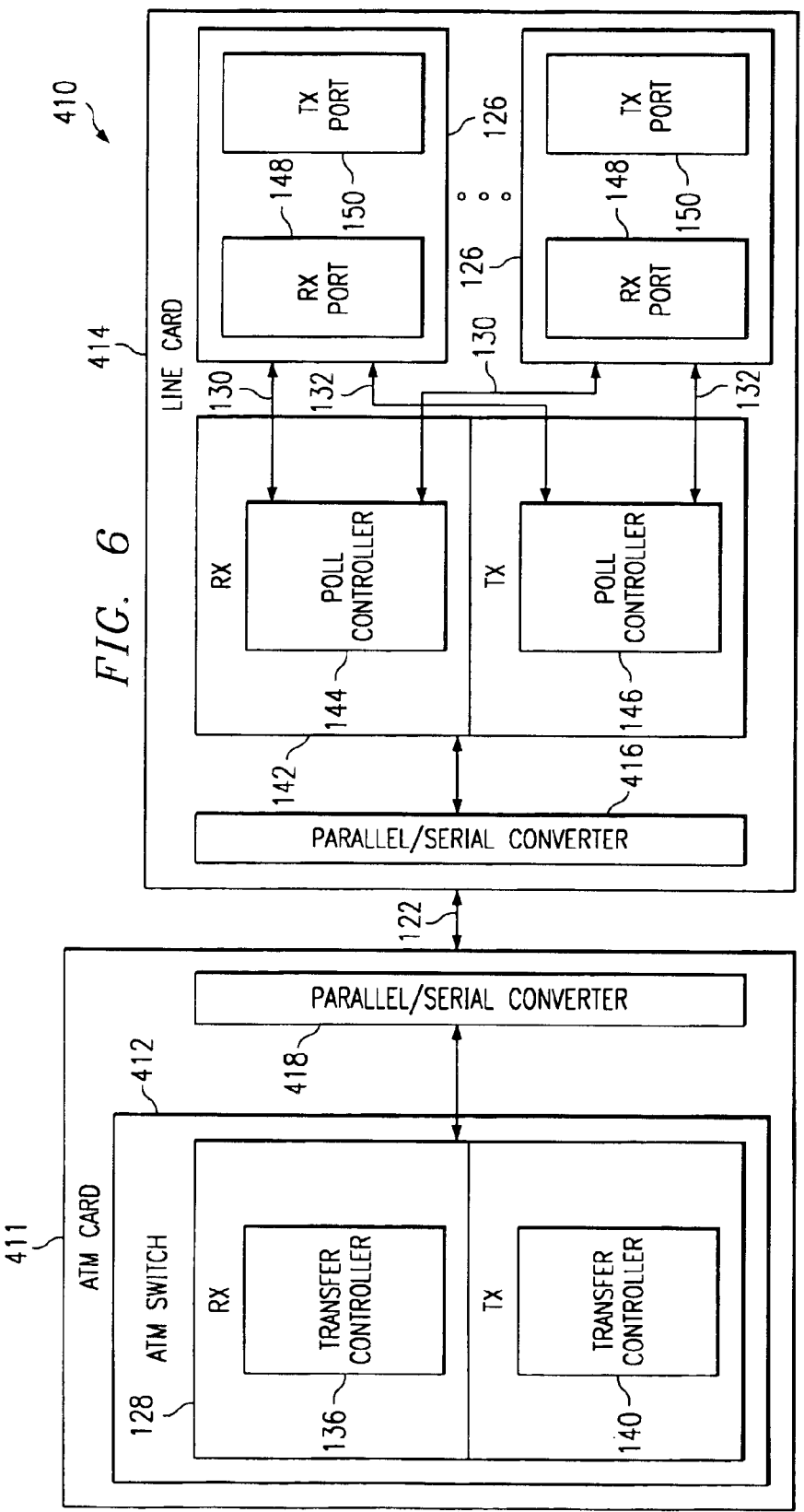
FIG. 6 is a block diagram showing an alternative embodiment of a communications system for transferring data between a master UTOPIA and a slave UTOPIA device, showing additional parallel/serial converters for allowing more rapid transfer of data between the master and slave devices.

FIG. 6 is a block diagram of an alternative embodiment of a communications system 410 according to the teachings of the present invention. Communications system 410 is substantially similar to communications 110, except that a parallel/serial converter 416 is included within line card 414 and a parallel/serial converter 418 is included within ATM card 411. Any suitable parallel/serial converter may be used and preferably high speed converters are used. An example converter is a Low Voltage Differential Signa (LVDS) converter. In all other respects, ATM card 411 and line card 414 are similar to ATM switch 111 and line card 114, respectively. By utilizing converters 412 and 416, the above-described data transmitted over cable 122 may be transmitted in a faster manner by converting the parallel data to serial form for transfer over cable 122 and then converting back to parallel form for use within ATM card 411 and line card 414 as described above.

Although the present invention and its advantages have been described in detail, it should be understood that various changes, substitutions, and alterations can be made therein without departing from the spirit and scope of the present invention as defined by the appended claims.

What is claimed is:

1. A system for communicating information comprising:
   a master UTOPIA device comprising:
   a receive transfer controller operable to control reception of data by the master UTOPIA device; and
   a transmit transfer controller operable to control transmission of data from an ATM switch;
   a slave UTOPIA device comprising at least one memory area, the slave UTOPIA device comprising:
   a receive poll controller operable to determine whether the memory area is available to transmit data for receipt by the master UTOPIA device and further operable to communicate the result of the determination to the receive transfer controller, wherein the receive poll controller includes a port selected from a group consisting of a roll enable port, a serial cell available port, a start of serial cell available port, a cell available port, an address port, a clock port, and a return clock port; and
   a transmit poll controller operable to determine whether the memory area is available for receiving data to be transmitted by the master UTOPIA device and further operable to communicate the result of the determination to the transmit transfer controller.

2. The system of claim 1, wherein the master UTOPIA device comprises an ATM card.

3. The system of claim 1, wherein the slave UTOPIA device comprises a DSL line card.

4. The system of claim 1, wherein the master UTOPIA device comprises an ATM card and wherein the slave UTOPIA device comprises a DSL line card, and further comprising a backplane directly connecting the ATM card to the DSL line card.

5. The system of claim 1, wherein the receive poll controller and transmit poll controller are each operable to transmit a return clock signal to an ATM card the ATM card for aligning data transferred to or received from the ATM card.

6. The system of claim 1, wherein the receive poll controller and the transmit poll controller are devoid of any memory areas.

7. The system of claim 1, wherein the port comprises a poll enable port.

8. The system of claim 1, wherein the port comprises a serial cell available port.

9. The system of claim 1, wherein the port comprises a start of serial cell available port.

10. The system of claim 1, wherein the port comprises a cell available port.

11. The system of claim 1, wherein the port comprises an address port.

12. The system of claim 1, wherein the port comprises a clock port.

13. The system of claim 1, wherein the port comprises a return clock port.

14. A UTOPIA slave device comprising:
a receive poll controller operable to determine whether a memory location on the UTOPIA slave device is available to transmit data for reception by a UTOPIA master device, wherein the receive poll controller includes a port selected from a group consisting of a poll enable port, a serial cell available port, a start of serial cell available port, a cell available port, an address port, a clock port, and a return clock port; and
a transmit poll controller operable to determine whether a memory location on the UTOPIA slave device is available to receive data to be transmitted by an ATM device.

15. The device of claim 14, wherein the receive poll controller includes a poll enable port, a serial cell available port, a start of serial cell available port, a cell available port, an address port, a clock port, and a return clock port.

16. The device of claim 14, wherein the transmit poll controller includes a poll enable port, a serial cell available port, a start of serial cell available port, a cell available port, an address port, a clock port and a return clock port.

17. The device of claim 14, wherein the UTOPIA slave device comprises a plurality of DSL modems.

18. The device of claim 14, and further comprising a serial/parallel converter for converting data received by the UTOPIA slave device into parallel format and for converting data transmitted by the UTOPIA slave device to serial format.

19. The device of claim 14, wherein the receive poll controller is operable to poll a plurality of DSL modems for determining whether each modem is available to transfer data.

20. The device of claim 14, wherein the transmit poll controller is operable to poll a plurality of DSL modems to determine whether the DSL modem is ready to receive data.

21. A UTOPIA master device comprising:
a receive transfer controller operable to communicate with a receive poll controller located remote from the UTOPIA master device on a UTOPIA slave device and further operable to control reception of data by the UTOPIA master device from the UTOPIA slave device, wherein the receive transfer controller comprises a port selected from a group consisting of a start of cell port, a data port, a return clock port, a clock port, an address port, a poll enable port, a serial cell available port, and a start of cell available port; and
a transmit transfer controller operable to communicate with a transmit poll controller located remote from the UTOPIA master device on the UTOPIA slave device and further operable to control transmission of data by the UTOPIA master device to the UTOPIA slave device.

22. The device of claim 21, wherein the receive transfer controller comprises a start of cell port, a data port, a return clock port, a clock port, an address port, a poll enable port, a serial cell available port, and a start of cell available port.

23. The device of claim 21, wherein the transmit transfer controller comprises a start of cell port, a data port, a return clock port, a clock port, an address port, a poll enable port, a serial cell available port, and a start of cell available port.

24. The device of claim 21, wherein the receive transfer controller is operable to produce a poll enable signal specifying to the receive poll controller locator remote from the UTOPIA master device that polling of a plurality of transferring devices should begin.

25. The device of claim 21, wherein the transmit transfer controller is operable to transmit a poll enable signal to the transmit poll controller, for a poll enable signal specifying that a plurality of modems should be polled to determine which device is prepared to receive data.

26. The device of claim 21, wherein the receive transfer controller and the transmit transfer controller are each operable to produce respective poll enable clock signals for transmission, respectively, to the receive poll controller and the transmit poll controller and further operable to receive, respectively, from the receive poll controller and the transmit poll controller a return clock signal for aligning data, respectively, received or transferred to the master device.

27. A method for communicating information between master and slave UTOPIA devices comprising:
providing a master UTOPIA device having a receive transfer controller operable to control reception of data by the master UTOPIA device and a transmit transfer controller operable to control transmission of or from the master UTOPIA device;
providing a slave UTOPIA device having a receive poll controller operable to determine whether the slave UTOPIA device is available to transmit data and further operable to communicate the result of the determination to the receive transfer controller and a transmit poll controller operable to determine whether the slave UTOPIA device is available for receiving data and further operable to communicate the result of determination through the transmit transfer controller, the receive poll controller comprising a port enable port;
connecting the master UTOPIA device to the slave UTOPIA device;
receiving, at the port enable port of the slave UTOPIA device from the master UTOPIA device, a poll enable signal to the slave UTOPIA device, the poll enable signal indicating a request for the slave UTOPIA device to poll a plurality of physical devices to determine whether any one of the physical devices is available to receive data; and
transmitting information between the master UTOPIA device and the slave UTOPIA device, wherein said transmitting comprises:
determining, by the receive poll controller located on the slave UTOPIA device that the slave UTOPIA device is ready to transfer data to the master UTOPIA device, and in response initiating, by the receive transfer controller located on the master UTOPIA device, transfer of data from the slave UTOPIA device to the master UTOPIA device; and
determining, by the transfer poll controller located on the slave UTOPIA device, that the slave UTOPIA device is ready to receive data to be transmitted by the master UTOPIA device, and in response initiating, by the transmit transfer controller located on the master UTOPIA device, transfer of data from the master UTOPIA device to the slave UTOPIA device.

28. The method of claim 27, wherein determining, by the receive poll controller, that the slave UTOPIA device is ready to transfer data to the master UTOPIA device comprises receiving a poll enable signal at the receive poll controller from the receive transfer controller.

29. The method of claim 28, wherein determining, by the receive poll controller, that the slave UTOPIA device is ready to transfer data to the master UTOPIA device further comprises polling a plurality of modems on the UTOPIA slave device determine whether each modem is available to transfer data.

30. The method of claim 27, and further comprising transmitting by the master UTOPIA device a poll enable signal to the slave UTOPIA device, the poll enable signal indicating that the slave UTOPIA device should poll a plurality of modems to determine whether they are ready to transfer data.

31. The method of claim 27, and further comprising transmitting by the master UTOPIA device a poll enable signal to the slave UTOPIA device, the poll enable signal indicating that the slave UTOPIA device should poll a plurality of modems to determine whether they are ready to receive data.

32. The method of claim 27, and further comprising receiving at the master UTOPIA device, a return clocks signal or aligning data to be received by the master UTOPIA device from the slave UTOPIA device.

33. The method of claim 27, and further comprising transmitting a poll enable signal from the master UTOPIA device to the slave UTOPIA device, the poll enable signal indicating that the slave UTOPIA device should halt polling of modems.

34. A system for communicating data between a master UTOPIA device and a slave UTOPIA device comprising:
- a transmit control means for controlling transmission of data from the master UTOPIA device to the slave UTOPIA device;
- a receive control means for controlling reception of data at the master UTOPIA device from the slave UTOPIA device;
- a transmit poll means for determining whether the slave UTOPIA device is ready to receive data transmitted by the master UTOPIA device and for communicating the result of said determination to the transmit control means;
- a receive poll means for determining whether the slave UTOPIA device is ready to transmit data for reception by the master UTOPIA device and for communicating the result of said determination to the receive control means;
- a cable means disposed between and connecting together the master UTOPIA device and a slave UTOPIA device; and
- wherein the transmit control means and receive control means are separated from the transmit poll means and the receive poll means by the cable means.

* * * * *

UNITED STATES PATENT AND TRADEMARK OFFICE
CERTIFICATE OF CORRECTION

PATENT NO. : 6,862,294 B1 Page 1 of 1
APPLICATION NO. : 09/751061
DATED : March 1, 2005
INVENTOR(S) : William P. Hann et al.

It is certified that error appears in the above-identified patent and that said Letters Patent is hereby corrected as shown below:

Column 10, Line 36, Claim 1, after "consisting of a" delete "roll" and insert -- poll --.
Column 10, Line 56, Claim 5, after "an ATM card" delete "the ATM card".

Signed and Sealed this

Twenty-fifth Day of July, 2006

JON W. DUDAS
*Director of the United States Patent and Trademark Office*